(12) United States Patent
Kinder et al.

(10) Patent No.: US 10,263,788 B2
(45) Date of Patent: Apr. 16, 2019

(54) SYSTEMS AND METHODS FOR PROVIDING A MAN-IN-THE-MIDDLE PROXY

(71) Applicant: SECUREWORKS HOLDING CORPORATION, Atlanta, GA (US)

(72) Inventors: Ross R. Kinder, Ann Arbor, MI (US); Jon R. Ramsey, Atlanta, GA (US); Timothy M. Vidas, Omaha, NE (US); Robert Danford, Boulder, CO (US)

(73) Assignee: Dell Products, LP, Round Rock, TX (US)

( * ) Notice: Subject to any disclaimer, the term of this patent is extended or adjusted under 35 U.S.C. 154(b) by 505 days.

(21) Appl. No.: 14/991,637

(22) Filed: Jan. 8, 2016

(65) Prior Publication Data

US 2017/0201381 A1     Jul. 13, 2017

(51) Int. Cl.
*H04L 29/06* (2006.01)
*H04L 9/32* (2006.01)

(52) U.S. Cl.
CPC ........ *H04L 9/3263* (2013.01); *H04L 63/0281* (2013.01); *H04L 63/101* (2013.01)

(58) Field of Classification Search
None
See application file for complete search history.

(56) References Cited

U.S. PATENT DOCUMENTS

| | | | |
|---|---|---|---|
| 7,299,292 B2 | 11/2007 | Morten et al. | |
| 8,286,228 B2 | 10/2012 | Venters, III et al. | |
| 9,531,705 B1 * | 12/2016 | Mehner | H04L 63/0823 |
| 9,888,037 B1 * | 2/2018 | Sharifi Mehr | H04L 63/18 |
| 9,923,923 B1 * | 3/2018 | Sharifi Mehr | H04L 63/166 |
| 2007/0263650 A1 * | 11/2007 | Subramania | H04L 47/10 370/412 |
| 2008/0148380 A1 * | 6/2008 | Abzarian | H04L 63/0263 726/11 |
| 2009/0323954 A1 * | 12/2009 | Sprunk | G06F 21/606 380/259 |
| 2010/0180080 A1 | 7/2010 | Lin et al. | |
| 2010/0199094 A1 * | 8/2010 | Ho | H04L 9/0844 713/171 |
| 2010/0299525 A1 * | 11/2010 | Shah | H04L 63/0428 713/171 |
| 2012/0284506 A1 * | 11/2012 | Kravitz | G06Q 40/00 713/151 |
| 2012/0324568 A1 * | 12/2012 | Wyatt | G06F 21/51 726/13 |
| 2014/0250501 A1 | 9/2014 | Berard et al. | |
| 2015/0271171 A1 * | 9/2015 | Rakshit | H04L 63/0823 726/10 |

(Continued)

*Primary Examiner* — Michael R Vaughan
(74) *Attorney, Agent, or Firm* — Larson Newman, LLP (57) ABSTRACT

A method for operating a secure man-in-the-middle proxy includes intercepting an attempt to establish a connection between an application and a network server associated with a whitelisted hostname, establishing a secure connection to the network server, checking the secure connection against the stored combination of certificate, encryption protocol, and encryption cipher for the whitelisted hostname, and forwarding traffic between the application and the network server at the whitelisted hostname if the secure connection matches the stored combination of certificate, encryption protocol, and encryption cipher for the whitelisted hostname.

19 Claims, 4 Drawing Sheets

(56) References Cited

U.S. PATENT DOCUMENTS

2016/0050135 A1* 2/2016 Kochut ................ H04L 43/106
709/224
2016/0226827 A1* 8/2016 Bohannon ........... H04L 63/0281
2016/0255077 A1* 9/2016 Lee ..................... H04L 63/0823
713/159

* cited by examiner

SYSTEMS AND METHODS FOR PROVIDING A MAN-IN-THE-MIDDLE PROXY

FIELD OF THE DISCLOSURE

The present disclosure generally relates to information handling systems, and more particularly relates to secure SSL man-in-the-middle with pinning and whitelisting.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
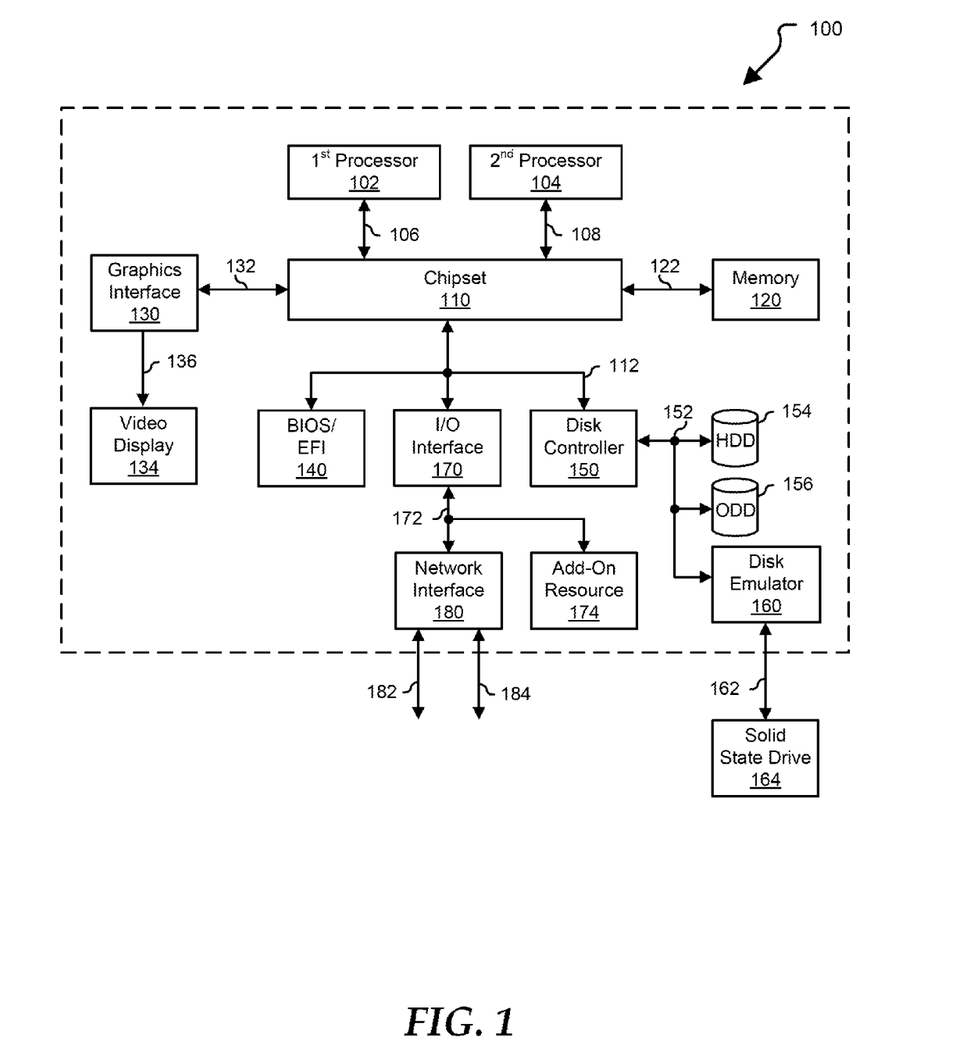
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

To establish secure network connection between a client system and a remote server, such as when using Secure Sockets Layer (SSL) or a Transport Layer Security (TLS), it can be necessary for the client and the server to use a common protocol and cipher. However, without a prior agreement, it can be necessary for the client and server to negotiate which protocol and cipher to use. In a typical use case, the client can identify to the server a highest version of a protocol, as well as a suggested list of ciphers. The server can respond by identifying a protocol and cipher to be used. Generally, the selected protocol would be the latest version of the protocol supported by both the client and the server. Additionally, the server can send a trust certificate to establish that the server is the intended server and not a rouge system pretending to be the intended server.

In certain circumstances, the establishment of a connection can be susceptible to a downgrade attack. In a downgrade attack, an attacker can intercept the negotiation between the client and server and force the selection of an older protocol with known vulnerabilities. For example, by intercepting and rewriting the initial communication from the client to the server, the attacker can tell the server the highest version of the protocol available to the client can be the older version, and can limit the list of suggested ciphers to weak ciphers. The server is then forced into selecting the older protocol and a weak cipher, which can make it easier for the attacker to break the encryption.

In various environments, it can be desirable to inspect and filter network traffic, including encrypted traffic between a client and server. To that end, a man-in-the-middle (MITM) proxy can be used. Traffic from the client can be redirected to the MITM proxy. The MITM proxy can establish a secure connection between the MITM proxy and the server on behalf of the client, and can establish a secure connection with between the MITM proxy and the client. In this way, the MITM proxy can decrypt and inspect all traffic between the client and server, and can potentially filter out traffic that is undesirable.

Figure 2:
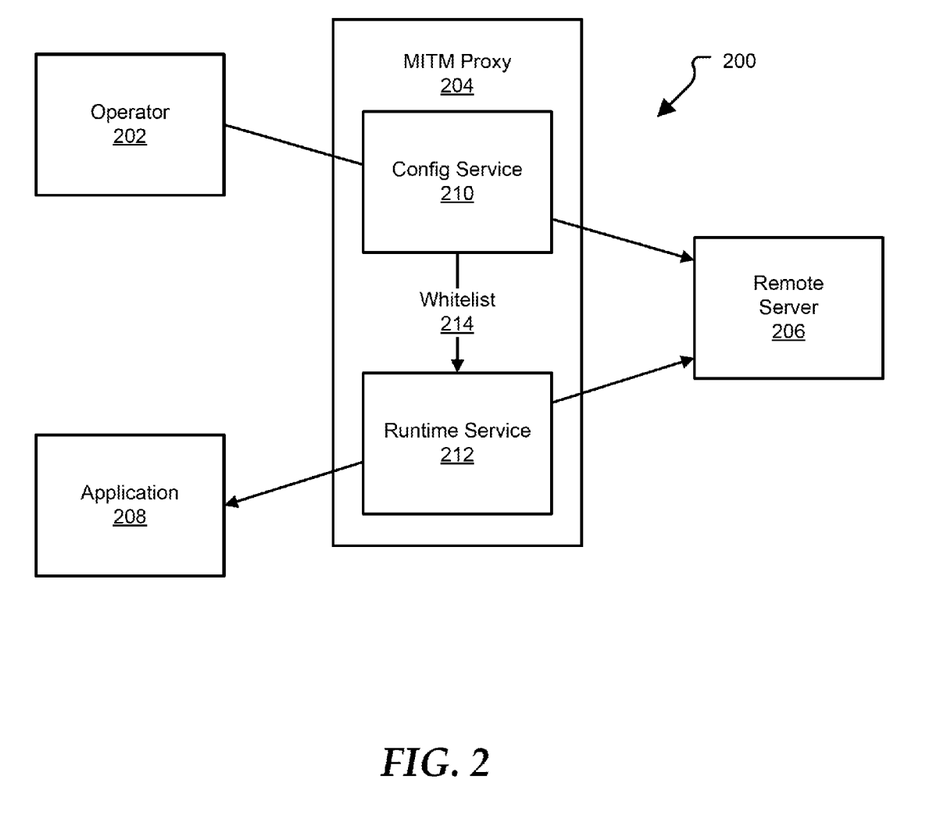
FIG. 2 is a block diagram illustrating a man-in-the-middle proxy system, in accordance with various embodiments.

FIG. 2 shows a man-in-the-middle (MITM) proxy system 200. The MITM system 200 can include an operator 202, a MITM proxy 204, a remote server 206, an application 208. The MITM proxy 204 can include a configuration service 210 and a runtime service 212. Configuration server 210 can pre-negotiate trust certificates, protocol versions, and ciphers with the remote server. Configuration server 210 can store the trust certificates, protocol versions, and ciphers in a whitelist 214.

When application 208 attempts to establish a secure connection to remote server 206, runtime service 212 can check against the pre-negotiated trust certificates, protocol versions, and ciphers from the whitelist 214 to ensure that communication with remote server 206 has not been forced to a less secure protocol or cipher and that the certificate matches to ensure the server is not being spoofed.

In various embodiments, the MITM proxy 204 can be a separate system from the information handling system running the application 208 and the remote server 206. In other embodiments, the MITM proxy 204 can be a security service running on the same information handling system as application 208. In still other embodiments, the application 208 and remote server 206 can be run on the same information handling system, such as in separate virtual machines or separate virtual containers, and the MITM proxy 204 can provide an increased level of security to isolate the two processes.

Figure 3:
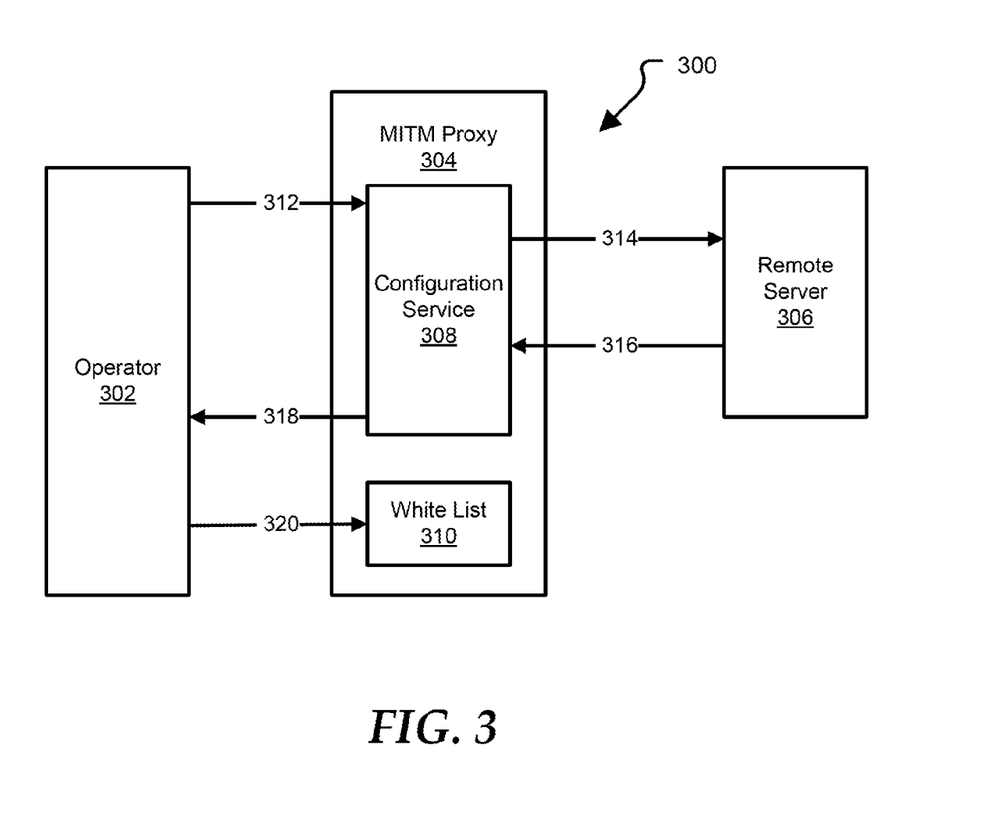
FIG. 3 is a block diagram illustrating the configuration of a man-in-the-middle proxy, in accordance with various embodiments.

FIG. 3 shows the process 300 used for configuring the MITM proxy, such as MITM proxy 204 in FIG. 2. Configuration involves operator 302, MITM proxy 304, including the configuration service 308 and whitelist 310, and remote server 306. During configuration, the operator 302 can identify a server to the configuration service 308, at 312. In various embodiments, the operator 302 can communicate with the configuration service 308 by creating a policy to allow an application to connect to the remote server 306.

The configuration service 308 can interrogate remote server 306, at 314. Interrogation can involve sending a connection request to remote server 306, including a protocol version and a selection of ciphers. At 316, remote server 306 can respond to the configuration service 308 with a selected protocol, a selected cipher, and a trust certificate. In various embodiments, the configuration service 308 may send multiple connection requests with various combinations of protocol versions and ciphers to identify various options available to the remote server 306 and how to manipulate the remote server 306 to select a desired protocol and cipher.

At 318, the configuration service 308 can send a trust recommendation to the operator. The trust recommendation can include a recommendation of a protocol and cipher to use for communicating with remote server 306. In various embodiments, the configuration server may determine that the protocol version and/or ciphers supported by the remote server 306 are not sufficiently up-to-date or are otherwise too vulnerable to compromise and may recommend to the operator 302 that remote server 306 should not be added to the whitelist 310.

At 320, the operator 302 can review and approve the trust recommendation and the trust recommendation can be added to the whitelist 310. The whitelist 310 may store a minimum protocol version and one or more approved ciphers for use with the remote server 306. Additionally, the certificate from remote server 306 can be stored.

In various embodiments, approval of the trust recommendation can be automated, such as by checking the settings against a list of approved protocols, ciphers, and certificate issuers. When the trust recommendation meets an approved list of protocols, ciphers and certificate issuers, the trust recommendation can be added to the whitelist 310 without further operator intervention.

Figure 4:
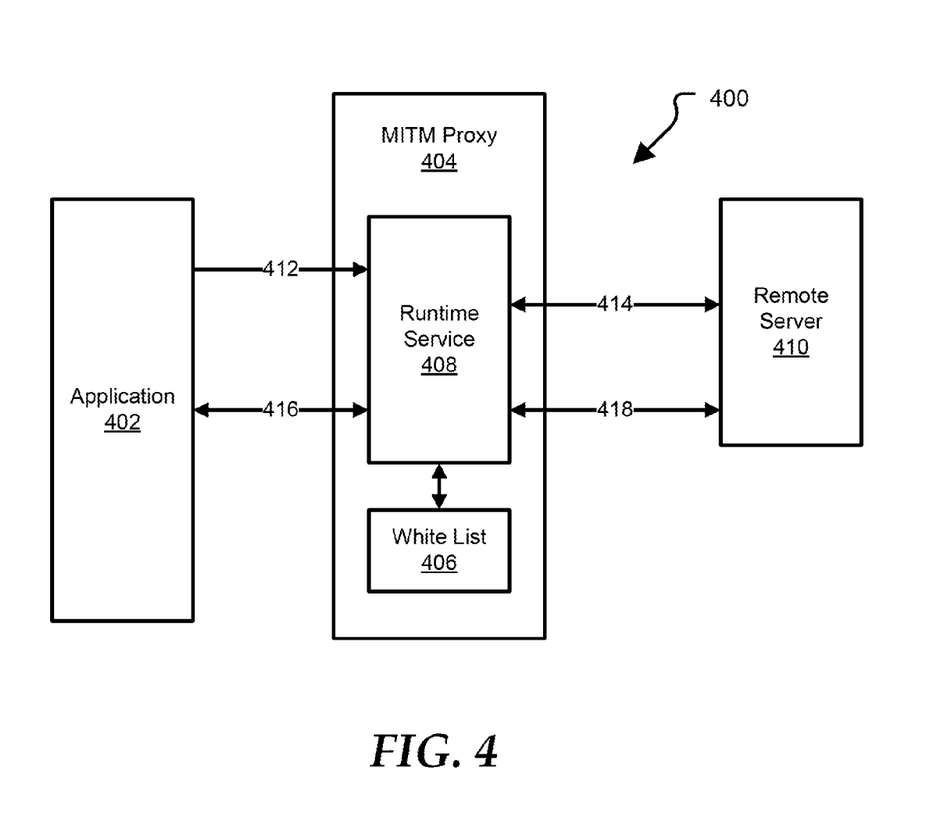
FIG. 4 is a block diagram illustrating the operation of a man-in-the-middle proxy, in accordance with various embodiments.

FIG. 4 shows the runtime operation 400 of a MITM proxy, such as MITM proxy 204 in FIG. 2. Runtime operation 400 involves application 402, MITM proxy 404, including whitelist 406 and runtime service 408, and remote server 410. When application 402 initiates a connection with remote server 410, the connection request 412 can be intercepted by runtime service 408. Runtime service 408 can check the whitelist 406 to determine if the connection is allowed. If the remote server 410 is not in the whitelist, the runtime service 408 can reject the connection.

Alternatively, at 414, if the remote server 410 is in the whitelist 406, the runtime service 408 can initiate a connection with remote server 410. The remote server 410 can select a protocol and cipher and provide a trust certificate to the runtime service 408. The runtime service 408 can compare the protocol, cipher, and trust certificate provided by the remote server 410 to the trust recommendation stored in the whitelist 406. If any of the protocol, cipher, and trust certificate fails to meet the requirements of the trust recommendation, the runtime service 408 can reject the connection to remote server 410.

If the protocol, cipher, and trust certificate meets the requirements of the trust recommendation stored in the whitelist 406, the runtime service 408 can establish secure connections 416 and 418 between the application 402 and the runtime service 408 and between the runtime service 408 and the remote server 410 respectively. Once secure connections 416 and 418 have been established, the runtime service 408 can forward traffic between the application 402 and the remote server 410.

In various embodiments, having a whitelist and a predetermined set of a protocol, a cipher, and a trust certificate for the remote server can substantially prevent successful downgrade attacks. If an attacker were to intercept the connection request between the runtime service 408 and the remote server 410 and force the remote server to downgrade the protocol and/or cipher, the resulting connection would be rejected by the runtime service 408 for failing to meet the requirements of the trust certificate stored in the whitelist 406. Additionally, by checking the trust certificate against a previously stored trust certificate, attempts to spoof the remote server 410 can be identified and rejected.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for operating a secure man-in-the-middle proxy on an information handling system, comprising:
   pre-negotiating certificates, encryption protocol, and encryption cipher with a network server associated with a hostname and adding the hostname, pre-negotiated certificates, encryption protocol, and encryption cipher to a whitelist when the pre-negotiated certificates, encryption protocol, and encryption cipher meet an approved list of certificates, encryption protocol, and encryption cipher;
   intercepting an attempt to establish a connection between an application and a network server associated with the hostname;
   establishing a secure connection to the network server;
   checking the secure connection against the stored combination of certificate, encryption protocol, and encryption cipher for the hostname; and
   forwarding traffic between the application and the network server at the hostname if the secure connection matches the stored combination of certificate, encryption protocol, and encryption cipher for the hostname.

2. The method of claim 1, further comprising rejecting attempted connections to hostnames not in the whitelist.

3. The method of claim 1, wherein the application is running on the information handling system with the secure man-in-the-middle proxy.

4. The method of claim 3, wherein the application is running in a virtual container on the information handling system.

5. The method of claim 1, wherein the method is performed on a firewall and the application is running on an application server behind the firewall.

6. The method of claim 1, wherein the stored combination of certificate, encryption protocol, and encryption cipher for the whitelisted hostname is verified with the network server prior to the attempt to establish a connection between the application and the network server.

7. The method of claim 6, wherein the verification is performed when the hostname is added to the whitelist.

8. An information handling system comprising:
   a storage configured to store a whitelist of allowed network hostnames and combinations of certificates, network encryption protocols, and encryption ciphers for the allowed network hostnames; and
   a hardware processor configured to:
      pre-negotiate certificates, encryption protocol, and encryption cipher with a network server associated with the allowed hostnames and storing the combinations of certificates, network encryption protocol, and encryption cipher to a whitelist when the combination of certificates, encryption protocol, and encryption cipher meets an approved list of certificates, encryption protocol, and encryption cipher;
      intercept an attempt to establish a connection between an application and the whitelisted hostname;
      establish a secure connection to a network server at the whitelisted hostname;
      check the secure connection against the stored combination of certificate, encryption protocol, and encryption cipher for the whitelisted hostname; and
      forward traffic between the application and the network server at the whitelisted hostname if the secure connection matches the stored combination of certificate, encryption protocol, and encryption cipher for the whitelisted hostname.

9. The information handling system of claim 8, wherein the processor is further configured to:
   interrogate the network server corresponding to one of the allowed network hostnames to determine a current certificate, a supported network encryption protocol version, and a support encryption cipher; and
   store a known combination of certificate, network encryption protocol, and encryption cipher for the hostname.

10. The information handling system of claim 9, wherein the interrogating and storing is performed when the hostname is added to the whitelist.

11. The information handling system of claim 8, wherein the processor is further configured to rejecting attempted connections to hostnames not in the whitelist.

12. The information handling system of claim 8, wherein the application is running on the information handling system.

13. The information handling system of claim 12, wherein the application is running in a virtual container on the information handling system.

14. The information handling system of claim 8, wherein the information handling system is a firewall and the application is running on an application server behind the firewall.

15. A method for operating a secure man-in-the-middle proxy on an information handling system, comprising:
- interrogating a network server at a whitelisted hostname to determine a current certificate, a supported network encryption protocol version, and a support encryption cipher;
- storing a known combination of certificate, network encryption protocol, and encryption cipher for the whitelisted hostname when the combination of certificate, network encryption protocol, and encryption cipher meets an approved list of certificates, encryption protocol, and encryption cipher;
- intercepting an attempt to establish a connection between an application and the whitelisted hostname;
- establishing a secure connection to the network server at the whitelisted hostname;
- checking the secure connection against the stored combination of certificate, encryption protocol, and encryption cipher for the whitelisted hostname; and
- forwarding traffic between the application and the network server at the whitelisted hostname if the secure connection matches the stored combination of certificate, encryption protocol, and encryption cipher for the whitelisted hostname.

16. The method of claim 15, further comprising rejecting attempted connections to hostnames not in the whitelist.

17. The method of claim 15, wherein the application is running on the information handling system.

18. The method of claim 17, wherein the application is running in a virtual container on the information handling system.

19. The method of claim 15, wherein the method is performed on a firewall and the application is running on an application server behind the firewall.

\* \* \* \* \*